United States Patent [19]
Kurihara

[11] Patent Number: 5,157,689
[45] Date of Patent: Oct. 20, 1992

[54] GOLD CODE GENERATING DEVICE IN A SPREAD SPECTRUM COMMUNICATION DEVICE

[75] Inventor: Takao Kurihara, Tokyo, Japan
[73] Assignee: Clarion Co., Ltd., Tokyo, Japan
[21] Appl. No.: 751,819
[22] Filed: Aug. 30, 1991

[30] Foreign Application Priority Data
Aug. 31, 1990 [JP] Japan .................. 2-227958

[51] Int. Cl.⁵ .............................................. H04K 1/00
[52] U.S. Cl. ................................................. 375/1
[58] Field of Search ............................. 364/717; 375/1

[56] References Cited

U.S. PATENT DOCUMENTS

| | | | |
|---|---|---|---|
| 4,689,626 | 8/1987 | Hori et al. ..................... | 375/1 |
| 4,847,861 | 7/1989 | Hamatsu et al. ............... | 375/1 |
| 4,862,479 | 8/1989 | Hamatsu et al. ............... | 375/1 |
| 4,864,525 | 9/1989 | Kurihara et al. ............... | 364/717 |
| 5,031,130 | 7/1991 | Harada .......................... | 364/717 |

FOREIGN PATENT DOCUMENTS
2-211732  8/1990 Japan ............................. 375/1

*Primary Examiner*—Salvatore Cangialosi
*Attorney, Agent, or Firm*—Flynn, Thiel, Boutell & Tanis

[57] ABSTRACT

A GOLD code generating device in an SSC device is disclosed, which is so constructed that, in the case where two kinds of GOLD codes are used in the SSC device by the CSK system, etc., in order to generate a GOLD code by means of two m sequence codes, a first GOLD code is generated by using an m sequence code generated by one of the m sequence code generators and another m sequence code generated by the other m sequence code generator, while a second GOLD code is generated by using an m sequence code obtained by delaying the m sequence code generated by the other m sequence code generator by a predetermined number of chips.

3 Claims, 5 Drawing Sheets

GOLD CODE GENERATING DEVICE IN A SPREAD SPECTRUM COMMUNICATION DEVICE

FIELD OF THE INVENTION

The present invention relates to a spread spectrum communication (hereinbelow abbreviated to SSC) device and in particular to an improvement of a GOLD code generating device used therein.

BACKGROUND OF THE INVENTION

In a spread spectrum communication device, as indicated in FIG. 5(a), a pseudo noise (PN) code, which is one of binary codes, is modulated with data and then a carrier is modulated with the modulated PN code to be transmitted. In the figure, reference numeral 31 is data; 32 is a modulator; 33 is a PN code generator (PNG); 34 is a carrier generator (OSC); 35 is a modulator; and 36 is an antenna. On the receiver side, as indicated in FIG. 5(b), the signal thus transmitted is received and correlation thereof with a PN code serving as a reference is formed in a matching filter. The data are reproduced by processing a self correlation waveform having a relatively large amplitude (hereinbelow, in the present specification, called correlation spike waveform) appearing when the two codes are in accordance with each other and in the neighborhood thereof. In the figure, reference numeral 37 is an antenna; 38 is a matching filter serving as a correlator; 39 is a reference PN code generator (PNG); 40 is a data demodulator; and 41 is data.

As one of matching filters 38 there is known a convolver. A convolver is a functional element executing convolution integration and acts as a matching filter effecting correlation operation, when a binary code serving as a reference (hereinbelow, in the present specification, called reference code) is in a time-inverted relationship with respect to the received code.

As an example of the convolver there is known a surface acoustic wave (hereinbelow abbreviated to SAW) convolver. In the SAW convolver, from the point of view of the structure, there are (1) those, in which an air gap is disposed between a piezo-electric body and a silicon substrate; (2) those, in which a piezo-electric body and a silicon substrate are formed in one body through an oxide film; (3) those composed only of a piezo-electric body; etc., either one of which effects multiplication operation by interaction of the two signals, utilizing non-linear characteristics, and integrates a result thus obtained in an electrode called gate disposed on an interaction region therefor.

FIG. 6 shows an example indicating the structure of the SAW convolver, in which 42 and 43 are transducers; 44 is a pezo-electric body; 45 is an oxide film; 46 is a silicon substrate; and 47 is a gate electrode. A signal s(t) inputted through the transducer 42 propagates towards the right in the figure and a signal r(t) inputted through the transducer 43 propagates towards the left. Interaction takes place between the two input signals s(t) and r(t) described above by non-linear characteristics, which a multilayered structure of piezo-electric body-oxide film-silicon substrate has, effecting multiplication operation, and a result thus obtained is integrated by the gate electrode 47.

A signal c(t) outputted by the gate electrode is represented by a following equation;

$$c(t) = A \int_{t-T}^{t} r\left(t - \frac{x}{v}\right) s\left(t - T + \frac{x}{v}\right) dx/v$$

where A is a constant; T is a time required for sonic wave to pass through the region under the gate electrode (hereinbelow, in the present specification, called in-gate delay time); x is a distance measured in the propagation direction of the signal s(t); and v is a sound velocity. In a direct spreading SSC using e.g. a correlator such as an SAW convolver, as means for dividing communication channels in the case where a maximum length linearly recurring sequence code (hereinbelow called simply m sequence code) is used as a spreading code, it is conceivable to use not only the kind of the m sequence code but also the initial phase of the m sequence code used on both the transmitter and the receiver side. Algorithms for determining the data reproduction timing and initial phase information of the m sequence code, etc. are described in JP-A-Sho 63-95744 (corresponds to U.S. Pat. No. 4,847,861).

In the case where the SSC system is executed by the CSK system, by which transmitted codes are switched over (e.g. code 1 is used when the transmitted data are "1" and code 2 is used when the transmitted data are "0"), depending on the polarity of the transmitted binary data, when GOLD codes are used for the code 1 and the code 2 described above, in order to generate two kinds of GOLD codes, i.e. GOLD code 1 and GOLD code 2, by using m sequence code generators as indicated in JP-A-Sho 63-18835 and JP-A-Sho 63-132519 which both correspond to U.S. Pat. No. 4,864,525, two m sequence code generators are necessary for each of them, because the GOLD code is obtained by adding two kinds of m sequence codes mod. 2 (exclusive logic sum).

Consequently this system has a problem that the circuit scale for the m sequence generating circuit increases with increasing length of the period of the used GOLD codes.

OBJECT OF THE INVENTION

The object of the present invention is to provide an SSC system capable of generating GOLD codes by using an m sequence code generating circuit of small scale, in the case where the SSC using correlators such as SAW convolvers is effected by the CSK using GOLD codes.

SUMMARY OF THE INVENTION

In order to achieve the above object, a GOLD code generating device on the transmitter side in a spread spectrum communication device by the CSK system, by which a first GOLD code and a second GOLD code are transmitted while switching over them selectively, depending on information signals, according to a first invention of the present application is characterized in that it comprises a first m sequence code generator generating a first m sequence code; a second m sequence code generator generating a second m sequence code; phase delaying means for obtaining a first phase-delayed m sequence code by delaying the phase of either one code of the two m sequence codes by a predetermined number of chips; first exclusive logic sum means for forming an exclusive logic sum of the first m sequence code and the second m sequence code; and second exclusive logic sum means for forming an exclusive logic sum of the other code of the two m sequence codes and the first phase-delayed m sequence code.

A GOLD code generating device on the receiver side in a spread spectrum communication device by the CSK system, by which a first GOLD code and a second GOLD code are transmitted while switching over them selectively, depending on information signals, according to a second invention of the present application is characterized in that it comprises a third m sequence code generator generating a third m sequence code, which is a mirror image inverted in time with respect to the second m sequence code; a fourth m sequence code generator generating a fourth m sequence code, which is a mirror image inverted in time with respect to the first m sequence code; third exclusive logic sum means for forming an exclusive logic sum of the third m sequence code and the fourth m sequence code; phase delaying means for obtaining a second phase-delayed m sequence code by delaying the phase of either one code of the two m sequence codes by a predetermined number of chips; and fourth exclusive logic sum means for forming an exclusive logic sum of the other code of the third and the fourth m sequence code and the second phase-delayed m sequence code.

A GOLD code generating device in a spread spectrum communication device by the CSK system, by which a first GOLD code and a second GOLD code are transmitted while switching over them selectively, depending on information signals, according to a third invention of the present application is characterized in that a GOLD code generating device on the transmitter side comprises a first m sequence code generator generating a first m sequence code; a second m sequence code generator generating a second m sequence code; phase delaying means for obtaining a first phase-delayed m sequence code by delaying the phase of either one code of the two m sequence codes by a predetermined number of chips; first exclusive logic sum means for forming an exclusive logic sum of the first m sequence code and the second m sequence code; and second exclusive logic sum means for forming an exclusive logic sum of the other code of the two m sequence codes and the first phase-delayed m sequence code, while a GOLD code generating device on the receiver side comprises a third m sequence code generator generating a third m sequence code, which is a mirror image inverted in time with respect to the second m sequence code; a fourth m sequence code generator generating a fourth m sequence code, which is a mirror image inverted in time with respect to the first m sequence code; third exclusive logic sum means for forming an exclusive logic sum of the third m sequence code and the fourth m sequence code; phase delaying means for obtaining a second phase-delayed m sequence code by delaying the phase of either one code of the two m sequence codes by a predetermined number of chips; and fourth exclusive logic sum means for forming an exclusive logic sum of the other code of the third and the fourth m sequence code and the second phase-delayed m sequence code.

Owing to the construction described above, in the case where the SSC system using correlators is executed by the CSK system, it is possible to generate GOLD codes corresponding to codes 1 and 2 when data to be transmitted are "1" and "2" by means of 2 m sequence code generators on each of the transmitter side and the receiver side.

DETAILED DESCRIPTION

Figure 1:
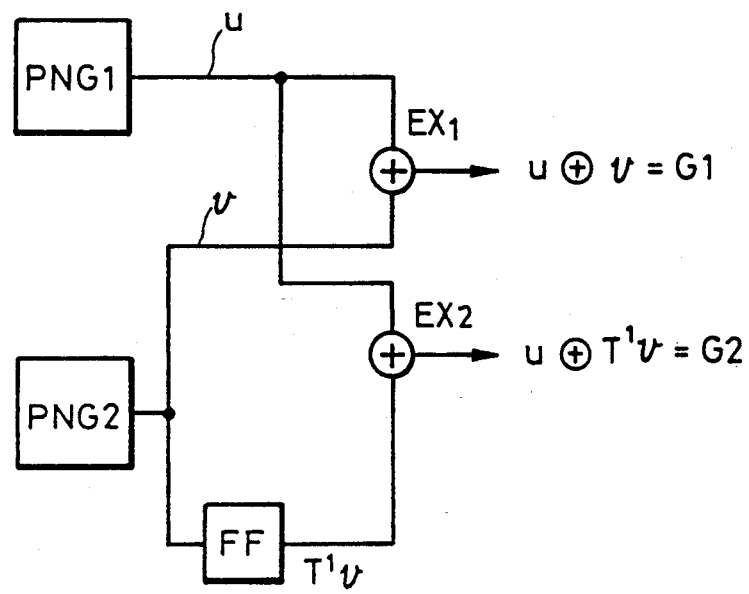
FIGS. 1(a) and 1(b) are schemes of a construction for generating two kinds of GOLD codes on the transmitter side and on the receiver side, respectively, according to the present invention.
Figure 1:
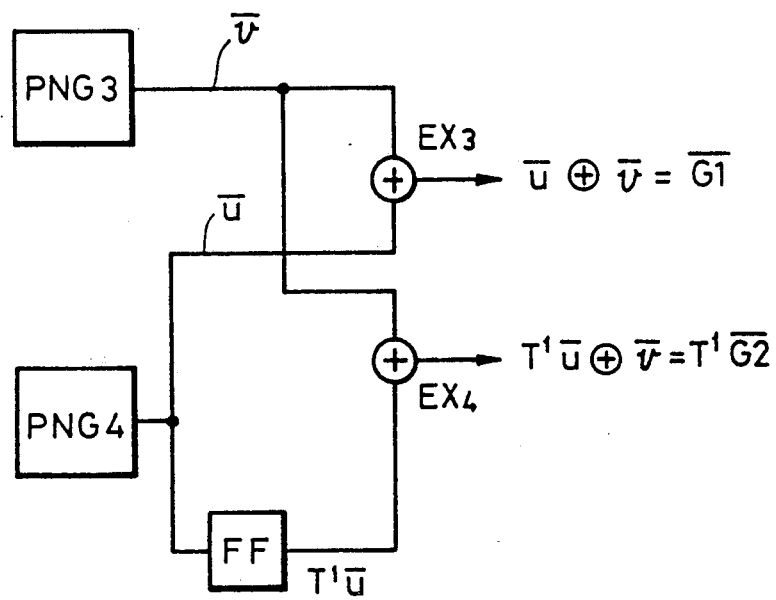
Figure 2:
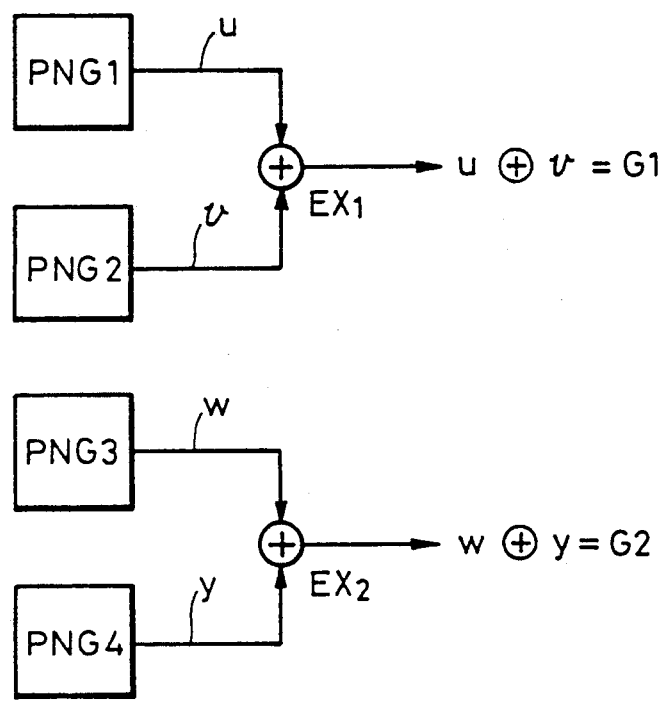
FIG. 2 shows a construction conceivable for generating two kinds of GOLD codes.

In FIGS. 1 and 2, u, v, $\bar{u}$, $\bar{v}$, w and y are m sequence codes, PNG1~PNG4 are m sequence code generators; G1, G2, $\overline{G1}$, $\overline{G2}$, G3 and G4 are GOLD codes; $EX_1$~$EX_4$ are exclusive logic sum gates executing addition mod. 2; and FF is a flipflop.

Figure 3:
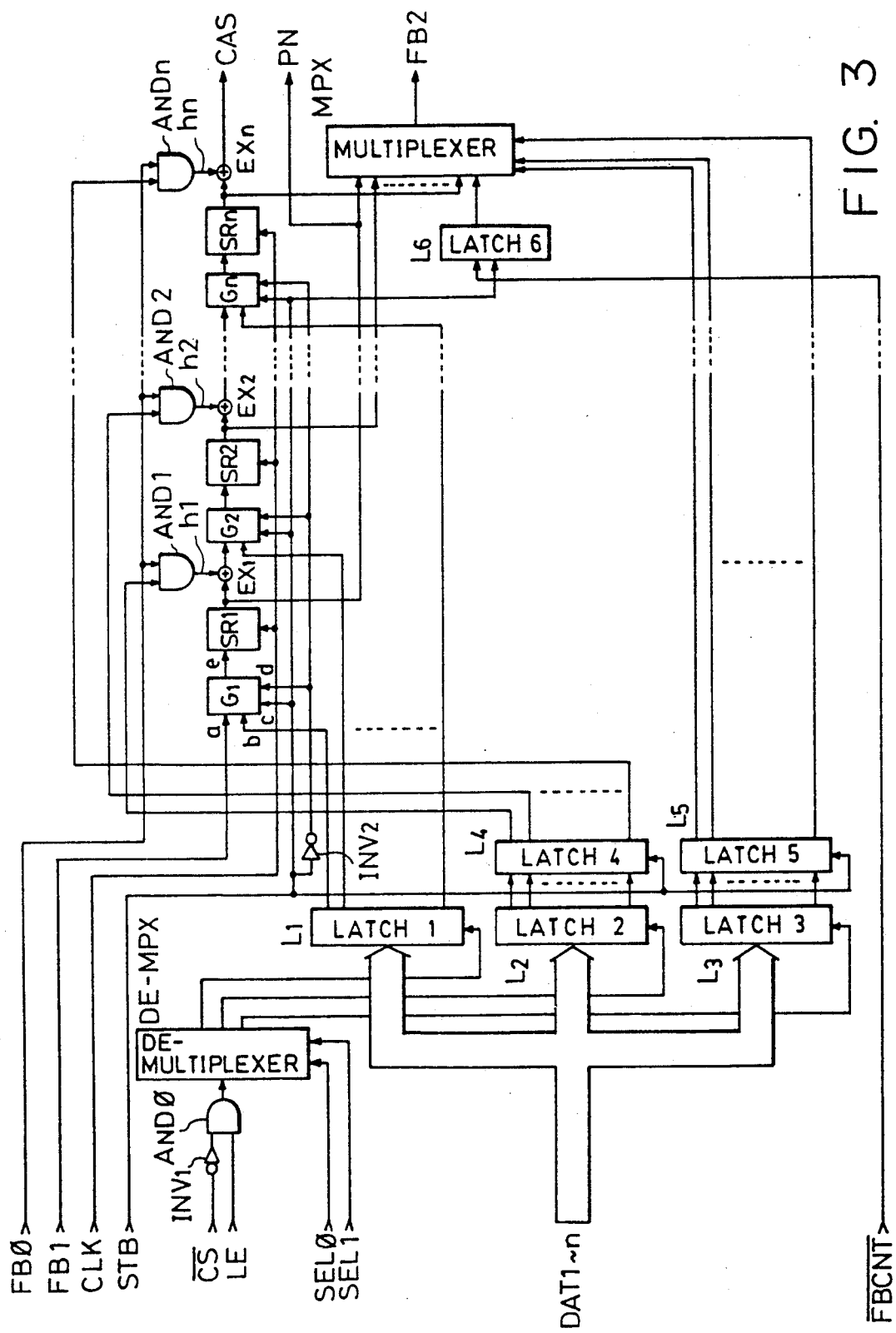
FIGS. 3 and 4 are block diagrams of m sequence code generators, which are object of the present invention.

In FIG. 3, $SR_1$~$SR_n$ are flipflops; $G_1$~$G_n$ are steering gate circuits; $EX_1$~$EX_n$ are exclusive logic sum gates; $AND_0$~$AND_n$ are AND gates; MPX is a multiplexer; DE-MPX is a demultiplexer; $INV_1$ and $INV_2$ are inverters; $L_1$~$L_6$ are latch circuits; CLK is a supplied clock; STB is a code switching strobe signal; $\overline{CS}$ is a chip select signal; LE is a latch enable signal; DAT1~n are initial information necessary for generating code by the code generating devices, which set following states (i) to (iii);

(i) initial state of the shift register,
(ii) feedback state, and
(iii) last stage selection state for the shift register.

SEL0~1 are data select signals, which select the data as indicated in TABLE 1. FB0~1 and CAS are input and output terminals for the cascade connection; FB2 is a three state output; and PN is an output of an m sequence code.

TABLE 1

| SEL 1 | SEL 0 | DATA |
| --- | --- | --- |
| L | L | (i) |
| L | H | (ii) |
| H | L | (iii) |
| H | H | Meaningless |

Figure 4:
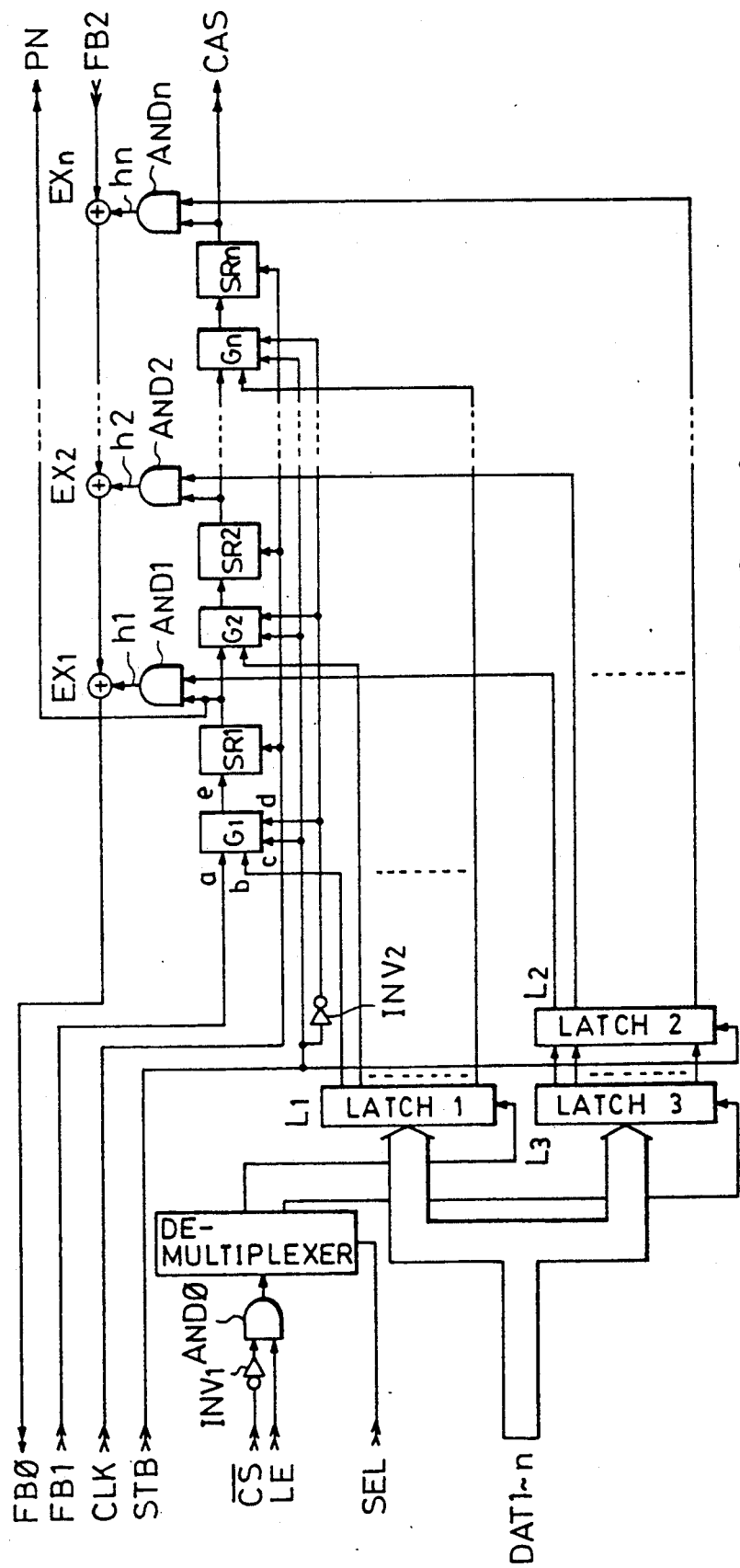
Figure 5A:
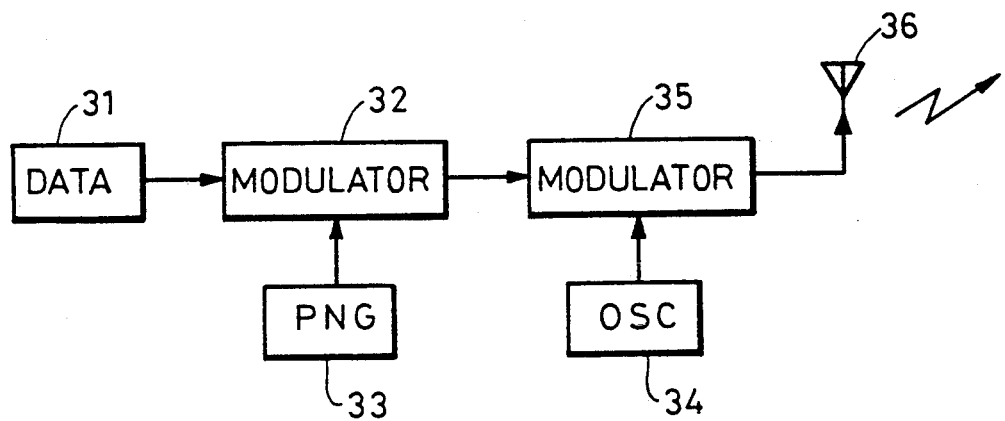
FIGS. 5(a) and 5(b) are block diagrams showing an example of a prior art spread spectrum communication system.
Figure 5B:
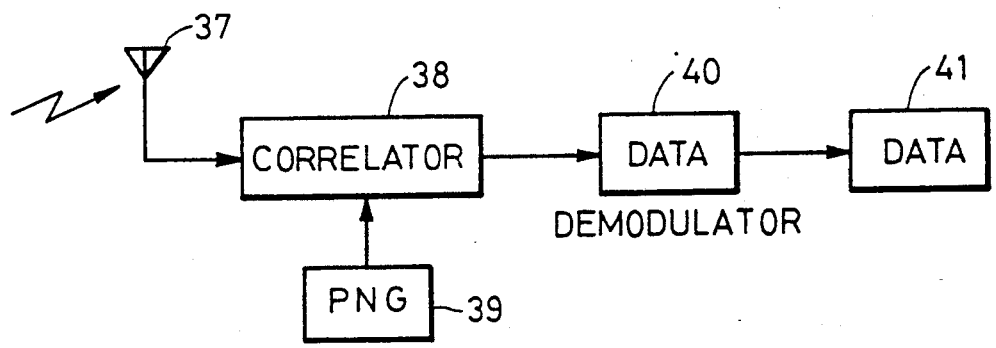
Figure 6:
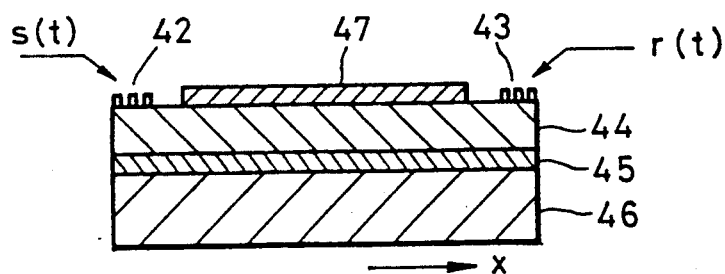
FIG. 6 is a cross-sectional view showing a construction of an SAW convolver as an example.

In FIG. 4, the symbols, which are used in FIG. 3 in common, represent parts, which are identical or similar to those described in FIG. 3, and data $DAT_1$~$DAT_n$ set following states (i) and (ii).

(i) initial state of the flipflops, and
(ii) feedback state and last stage selection state for the flipflops.

The data select signals SEL are signals for selecting data as indicated in TABLE 2.

TABLE 2

| SEL | DATA |
| --- | --- |
| L | (i) |
| H | (ii) |

FIG. 2 shows a construction conceived for generating the two kinds of GOLD codes and in this case 4 kinds of m sequence codes u, v, w and y are generated by using 4 m sequence code generators PNG1~PNG4 so as to obtain the GOLD code G1 generated from (u, v) and the GOLD code G2 generated from (w, y).

However the circuit scale for the m sequence code generating circuit increases with increasing length of the period of the used GOLD codes. Further it is necessary to set the initial information indicated in (i)~(iii) for PNG1~PNG4. FIG. 1(a) shows the m sequence codes u, v and $T^1v$ as well as the GOLD codes G1 (u $\oplus$ v) and G2 (u $\oplus$ $T^1$ v), where $T^1:T$ . . . state transition matrix, $i \begin{cases} \text{positive integer} \ldots \text{phase retard} \\ \text{negative integer} \ldots \text{phase advance.} \end{cases}$ Consequently $T^1$ v means a code, whose phase is retarded by 1 chip with respect to v, and it is obtained by taking out v through the flipflop FF.

Denoting "mirror images" of u and v by $\bar{u}$ and $\bar{v}$, respectively, the GOLD codes, which are to be generated on the receiver side, can be given by;

$G1 = u \oplus v \mapsto u \oplus \bar{v} = \overline{G1}$  (1)

$G2 = u \oplus T^1 v \mapsto u \oplus T^{-1} \bar{v} = \overline{G2}$  (2)

However by the construction indicated in FIGS. 1(a) and 1(b) it is not possible to generate an m sequence code expressed by $T^1\bar{v}$. Therefore, multiplying the right member of Eq. (2) by $T^1$, following Eq. (3) is obtained;

$T^1 u \oplus T^1 \cdot T^{-1} \bar{v} = T^1 u \oplus \bar{v} = T^1 \overline{G2}$  (3).

Although the phase of the GOLD code given by Eq. (3) is retarded by 1 chip with respect to the GOLD code given by Eq. (2), the code pattern thereof is completely identical to that of the latter.

Consequently, by setting on the receiver side $\bar{v}$ for PNG3 corresponding to u of PNG 1 on the transmitter side in FIG. 1(a) and $\bar{u}$ for PNG4 corresponding to v of PNG 2, as indicated in FIG. 1(b), it is possible to generate two kinds of GOLD codes, which are in the "mirror image" relation to each other, with a same construction on the transmitter side and on the receiver side.

Further, although a system, by which the phase is retarded by one chip, is used in the construction indicated in FIGS. 1(a) and 1(b), the present invention can be applied also to other cases where another system, by which the phase is retarded by any number of chips, is used.

Concerning the SS communication by the CSK system, refer to Japanese patent application No. Hei 1-29538.

As explained above, according to the present invention, an advantage can be obtained that it is possible to generate GOLD codes by using m sequence code generators having a small circuit scale.

While particular embodiments of the invention have been shown and described, it will be obvious to those skilled in the art that various changes and modifications may be made without departing from the present invention in its broader aspect.

The embodiments of the invention in which an exclusive property or privilege is claimed are defined as follows:

1. A GOLD code generating device on the transmitter side in a spread spectrum communication device using the CSK system, by which a first GOLD code and a second GOLD code are selectively transmitted by switching between them in dependence on information signals, comprising:
   a first m sequence code generator generating a first m sequence code;
   a second m sequence code generator generating a second m sequence code;
   phase delaying means for producing a phase-delayed m sequence code by delaying the phase of said second m sequence code by a predetermined number of chips;
   first exclusive logic sum means for forming said first GOLD code as an exclusive logic sum of said first m sequence code and said second m sequence code; and
   second exclusive logic sum means for forming said second GOLD code as an exclusive logic sum of said first m sequence code and said phase-delayed m sequence code.

2. A GOLD code generating device on the receiver side in a spread spectrum communication device using the CSK system, by which a first GOLD code and a second GOLD code derived from first and second m sequence codes are selectively transmitted by switching between them in dependence on information signals, comprising:
   an m sequence code generator generating a third m sequence code, which is a mirror image inverted in time with respect to said second m sequence code;
   an m sequence code generator generating a fourth m sequence code, which is a mirror image inverted in time with respect to said first m sequence code;
   exclusive logic sum means for forming a third GOLD code as an exclusive logic sum of said third m sequence code and said fourth m sequence code;
   phase delaying means for producing a phase-delayed m sequence code by delaying the phase of said fourth m sequence code by a predetermined number of chips; and
   exclusive logic sum means for forming a fourth GOLD code as an exclusive logic sum of said third m sequence code and said phase-delayed m sequence code.

3. A GOLD code generating device in a spread spectrum communication device using the CSK system, by which a first GOLD code and a second GOLD code are selectively transmitted by switching between them in dependence on information signals, comprising:
   a GOLD code generating device on the transmitter side which includes:
   a first m sequence code generator generating a first m sequence code;
   a second m sequence code generator generating a second m sequence code;
   phase delaying means for producing a first phase-delayed m sequence code by delaying the phase of said second m sequence code by a predetermined number of chips;
   first exclusive logic sum means for forming said first GOLD code as an exclusive logic sum of said first m sequence code and said second m sequence code; and
   second exclusive logic sum means for forming said second GOLD code as an exclusive logic sum of said first m sequence code and said first phase-delayed m sequence code; and a GOLD code generating device on the receiver side which includes:

a third m sequence code generator generating a third m sequence code, which is a mirror image inverted in time with respect to said second m sequence code;

a fourth m sequence code generator generating a fourth m sequence code, which is a mirror image inverted in time with respect to said first m sequence code;

third exclusive logic sum means for forming a third GOLD code as an exclusive logic sum of said third m sequence code and said fourth m sequence code;

phase delaying means for producing a phase-delayed m sequence code by delaying the phase of said fourth m sequence code by a predetermined number of chips; and fourth exclusive logic sum means for forming a fourth GOLD code as an exclusive logic sum of said third m sequence code and said second phase-delayed m sequence code.

* * * * *